US011048523B2

(12) United States Patent
Ganesan et al.

(10) Patent No.: US 11,048,523 B2
(45) Date of Patent: Jun. 29, 2021

(54) ENABLING SOFTWARE SENSOR POWER OPERATION REQUESTS VIA BASEBOARD MANAGEMENT CONTROLLER (BMC)

(71) Applicant: DELL PRODUCTS, L.P., Round Rock, TX (US)

(72) Inventors: Vaideeswaran Ganesan, Bangalore (IN); Balamurugan Gnanasambandam, Pondicherry (IN); Tamilarasan Janakiram, Bangalore (IN); Sreeram Muthuraman, Trivandrum (IN)

(73) Assignee: Dell Products, L.P., Round Rock, TX (US)

( * ) Notice: Subject to any disclaimer, the term of this patent is extended or adjusted under 35 U.S.C. 154(b) by 120 days.

(21) Appl. No.: 16/171,329

(22) Filed: Oct. 25, 2018

(65) Prior Publication Data

US 2020/0133681 A1  Apr. 30, 2020

(51) Int. Cl.
  *G06F 9/44* (2018.01)
  *G06F 9/4401* (2018.01)
  *G06F 9/455* (2018.01)

(52) U.S. Cl.
  CPC .......... *G06F 9/442* (2013.01); *G06F 9/4416* (2013.01); *G06F 9/45558* (2013.01); *G06F 2009/45575* (2013.01)

(58) Field of Classification Search
  None
  See application file for complete search history.

(56) References Cited

U.S. PATENT DOCUMENTS

| 7,035,257 | B2 | 4/2006 | Vafaei |
| 7,076,645 | B2 | 7/2006 | Mittal et al. |
| 7,822,719 | B1 | 10/2010 | Noveck |
| 7,840,730 | B2 | 11/2010 | D'Amato et al. |
| 7,886,065 | B1 | 2/2011 | Satish et al. |
| 8,033,913 | B2 | 10/2011 | Cockerille et al. |
| 8,234,486 | B2 | 7/2012 | Bernardini et al. |
| 8,463,762 | B2 | 6/2013 | Petter et al. |
| 9,058,123 | B2 | 6/2015 | Joshi et al. |
| 9,348,646 | B1 | 5/2016 | Daya et al. |
| 9,400,611 | B1 | 7/2016 | Raizen |

(Continued)

*Primary Examiner* — Fahmida Rahman
(74) *Attorney, Agent, or Firm* — Isidore PLLC

(57) ABSTRACT

An information handling system (IHS), baseboard management controller (BMC) and method provide for coordinating the BMC and the host processor subsystem to avoid conflicts between power operations by BMC and maintenance activities by the host processor subsystem. In response to determining that a power operation is requested for the host processor subsystem, a service processor of the BMC determining whether a planned power operation (PPO) software sensor contains information indicating that the host processor subsystem is executing a critical operation utility. In response to determining that the host processor subsystem is not executing the critical operation utility, service processor updates/modifies information contained in the PPO software sensor to indicate that a power operation is scheduled. The modified information prevents the host processor subsystem from subsequently initiating execution of the critical operation utility. The service processor also schedules the power operation of the host processor subsystem.

16 Claims, 6 Drawing Sheets

(56) References Cited

U.S. PATENT DOCUMENTS

| | | | |
|---|---|---|---|
| 9,489,274 B2 | 11/2016 | Kondalsamy et al. | |
| 9,684,460 B1 | 6/2017 | Colgrove et al. | |
| 9,740,551 B2 | 8/2017 | Desai et al. | |
| 9,912,535 B2 | 3/2018 | Ayanam et al. | |
| 2011/0202922 A1* | 8/2011 | Reynolds | G06F 11/004 |
| | | | 718/100 |
| 2015/0149620 A1* | 5/2015 | Banerjee | G06F 9/5083 |
| | | | 709/224 |
| 2015/0355705 A1* | 12/2015 | Weissmann | G06F 1/3287 |
| | | | 713/322 |
| 2018/0095517 A1* | 4/2018 | Sagar | G06F 1/3287 |
| 2018/0095832 A1 | 4/2018 | Pillilli et al. | |

* cited by examiner

ENABLING SOFTWARE SENSOR POWER OPERATION REQUESTS VIA BASEBOARD MANAGEMENT CONTROLLER (BMC)

BACKGROUND

1. Technical Field

The present disclosure relates in general to power management controllers, and more particularly to power management controllers that manage power operations within an information handling system.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some implementations, IHSs can act as a server within a virtualized environment, providing processing and data storage to multiple users. One or more customers or processes can be assigned to a particular IHS via in-band communication over a network.

Generally-known enterprise IHSs are typically managed by more than one controller, such as host processor subsystems and baseboard management controllers (BMCs). The host processor subsystem manages compute and data storage workloads for users of the IHS and can be responsible for performing critical tasks that would be interrupted if a reboot were to occur. The BCM manages the infrastructure needs of the IHS, such as controlling power and cooling. Occasionally, the user or the BCM can trigger a power operation that results in a system reboot. These reboots interrupt the performance of the critical tasks by the host processor subsystem.

BRIEF SUMMARY

In accordance with the teachings of the present disclosure, an information handling system (IHS) includes a memory containing a critical operation utility. The IHS includes a host processor subsystem communicatively coupled to the memory and which executes the critical operation utility. The IHS includes a baseboard management controller (BMC) communicatively coupled to the memory. The BMC includes BMC memory with a planned power operation (PPO) software sensor and a service processor that executes a power operation utility to enable the IHS to determine that a power operation is requested for the host processor subsystem. In response to determining that the power operation is requested, the power operation utility enables the IHS to determine whether the PPO software sensor contains information indicating that the host processor subsystem is not executing the critical operation utility. In response to determining that the host processor subsystem is not executing the critical operation utility, the power operation utility enables the IHS to (i) modify information in the PPO software sensor to indicate that a power operation is scheduled and to (ii) schedule the power operation of the host processor subsystem, the modified information in the PPO software sensor prevents the host processor subsystem from subsequently initiating execution of the critical operation utility.

In accordance with the teachings of the present disclosure, a BMC of an IHS includes BMC memory with a planned power operation (PPO) software sensor and a system interface that is communicatively coupled to memory of the IHS. The memory contains a critical operation utility that is executed by a host processor subsystem of the IHS. A service processor executes a power operation utility to enable the BMC to determine that a power operation is requested for the host processor subsystem. In response to determining that the power operation is requested, the service processor determines whether the PPO software sensor contains information that indicates that the host processor subsystem is executing the critical operation utility. In response to determining that the host processor subsystem is not executing the critical operation utility, the service processor: (i) modifies information in the PPO software sensor to indicate that a power operation is scheduled; and (ii) schedules the power operation of the host processor subsystem. The modified information in the PPO software sensor prevents the host processor subsystem from subsequently initiating execution of the critical operation utility.

In accordance with the teachings of the present disclosure, a method is provided for preventing maintenance operations, such as a scheduled power cycle, from interfering with critical operations of an IHS. The method includes determining, by a BMC, that a power operation is requested for a host processor subsystem of an IHS. In response to determining that the power operation is requested, the method includes determining whether a PPO software sensor contained in the BMC memory contains information that indicates that the host processor subsystem is executing a critical operation utility contained in the memory. In response to determining that the host processor subsystem is not executing the critical operation utility, the method includes: (i) modifying information in the PPO software sensor to indicate that a power operation is scheduled; and (ii) scheduling the power operation of the host processor subsystem. The modified information in the PPO software sensor prevents the host processor subsystem from subsequently initiating execution of the critical operation utility.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
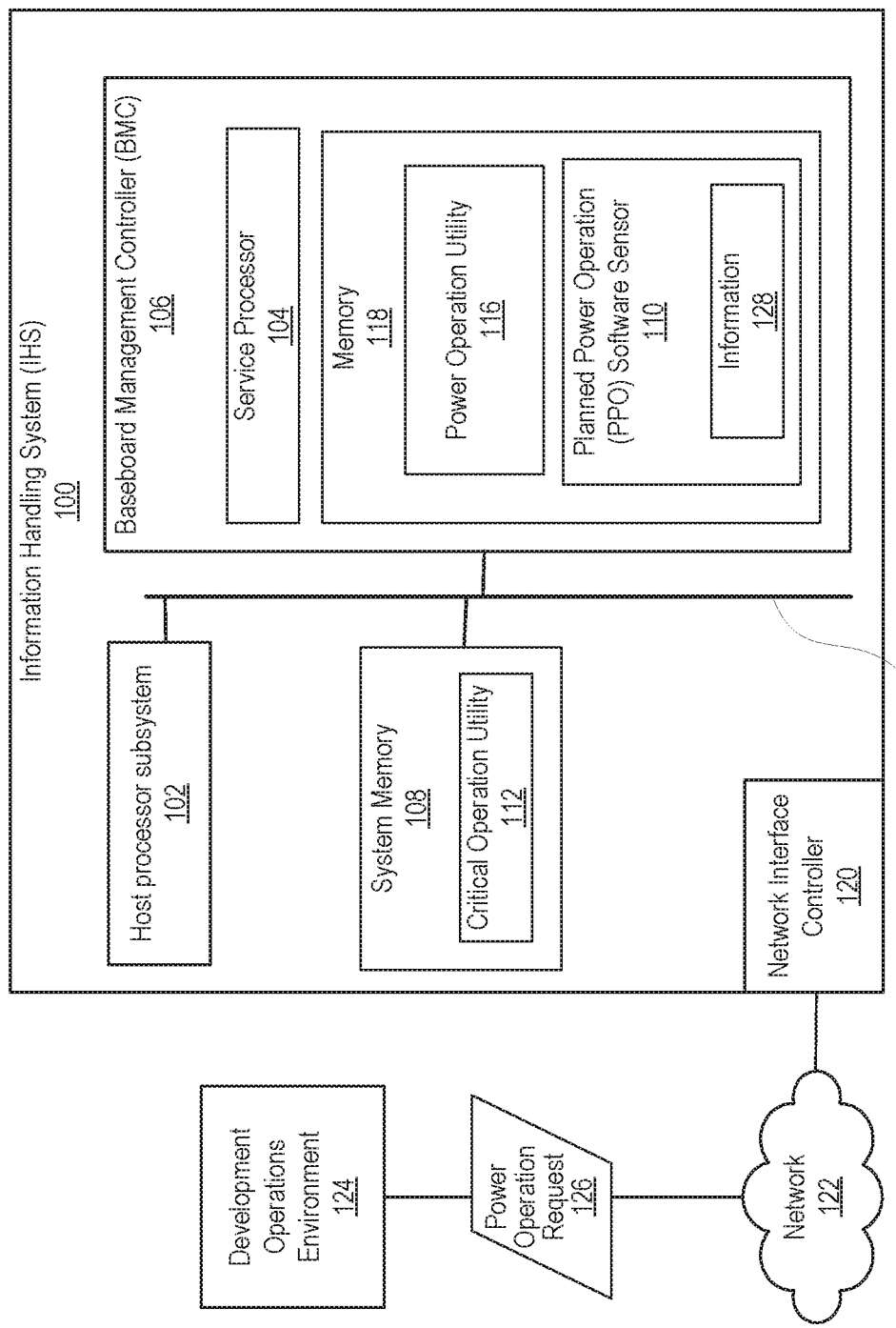
FIG. 1 is a simplified functional block diagram illustrating an information handling system (IHS) that coordinates performance of critical maintenance activities and power operations, according to one or more embodiments.

An information handling system (IHS), baseboard management controller (BMC), and method are provided for coordinating between the BMC and the host processor subsystem. The coordination avoids conflicts between power operations by BMC and maintenance activities by the host processor subsystem. In response to determining that a power operation is requested for the host processor subsystem, a service processor of the BMC determines whether a planned power operation (PPO) software sensor contains information indicating that the host processor subsystem is executing a critical operation utility. In response to determining that the host processor subsystem is not executing the critical operation utility, the service processor modifies information in the PPO software sensor to indicate that a power operation is scheduled. The modified information prevents the host processor subsystem from subsequently initiating execution of the critical operation utility. The service processor also schedules the power operation of the host processor subsystem.

The BMC of each IHS can be responsible for carrying out maintenance tasks received from a remote system. BMC is a specialized service processor that monitors the physical state of a computer, network server or other hardware device using sensors and communicating with the system administrator through an independent connection. BMC receives out-of-band communication over a network from an administrative console or development operations (DevOps) environment to schedule maintenance operations such as a firmware update or import server configuration profile. These maintenance operations require a server reboot that can adversely affect any ongoing critical operation performed by the host processor subsystem.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is a simplified functional block diagram illustrating an information handling system (IHS) 100 having first and second controllers that respectively perform critical maintenance activities and power operations of IHS 100. In one or more embodiments, the first controller can be host processor subsystem 102 and the second controller can be service processor 104 of baseboard management controller (BMC) 106. Within the general context of IHSs, IHS 100 may include any instrumentality or an aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, IHS 100 may be a personal digital assistant (PDA), a consumer electronic device, a network storage device, or any other suitable device and may vary in size, shape, performance, functionality, and price. IHS may include random access memory (RAM), one or more processing resources such as a central processing unit (CPU) or hardware or software control logic, read only memory (ROM), and/or other types of nonvolatile memory. Additional components of IHS 100 may include one or more disk drives, one or more network ports for communicating with external devices as well as various input and output (I/O) devices, such as a keyboard, a mouse, and a video display. IHS 100 may also include one or more buses operable to transmit communications between the various hardware components.

IHS 100 includes system memory 108 containing critical operation utility 112. BMC memory 118 contains planned power operation (PPO) software sensor 110. Any planned power operation request from BMC 106 is passed via PPO software sensor 110 to host processor subsystem 102. Host processor subsystem 102 is communicatively coupled to system memory 108. On certain occasions, host processor subsystem 102 performs a maintenance activity by executing critical operation utility 114. BMC 106 is communicatively coupled to system memory 108 via interconnect 115. Service processor 104 of BMC 106 executes a power operation utility 116 in BMC memory 118 to enable IHS 100 to determine that a power operation is requested for host processor subsystem 102. In one or more embodiments, IHS 100 includes a network interface controller 120 that enables BMC 106 to communicatively connect, via network 122, with development operations (DevOps) environment 124 that originates power operation request 126. Power operation requests 126 can occur to install a firmware update or to import server configuration profile onto BMC 106.

In response to determining that the power operation is requested, BMC 106 determines whether or not PPO software sensor 110 contains information 128 indicating that host processor subsystem 102 is executing critical operation utility 112. In response to determining that host processor subsystem 102 is not executing critical operation utility 112, BMC 106 modifies information in PPO software sensor 110 to indicate that a power operation is scheduled. When updated to include the information, PPO software sensor 110 prevents host processor subsystem 102 from subsequently initiating execution of critical operation utility 112. For example, host processor subsystem 102 checks PPO software sensor 110 before initiating a maintenance activity that includes executing critical operation utility 112. BMC 106 also schedules the power operation of host processor subsystem 102. Information 128 in PPO software sensor 110 can include all times during which BMC 106 may request a reboot. Any critical activities can be rejected by host processor subsystem 102 during these times. Host processor subsystem 102 can also check PPO software sensor 110 before starting any critical operation. If there is no planned power operation scheduled, host processor subsystem 102 can start a critical operation.

Figure 2:
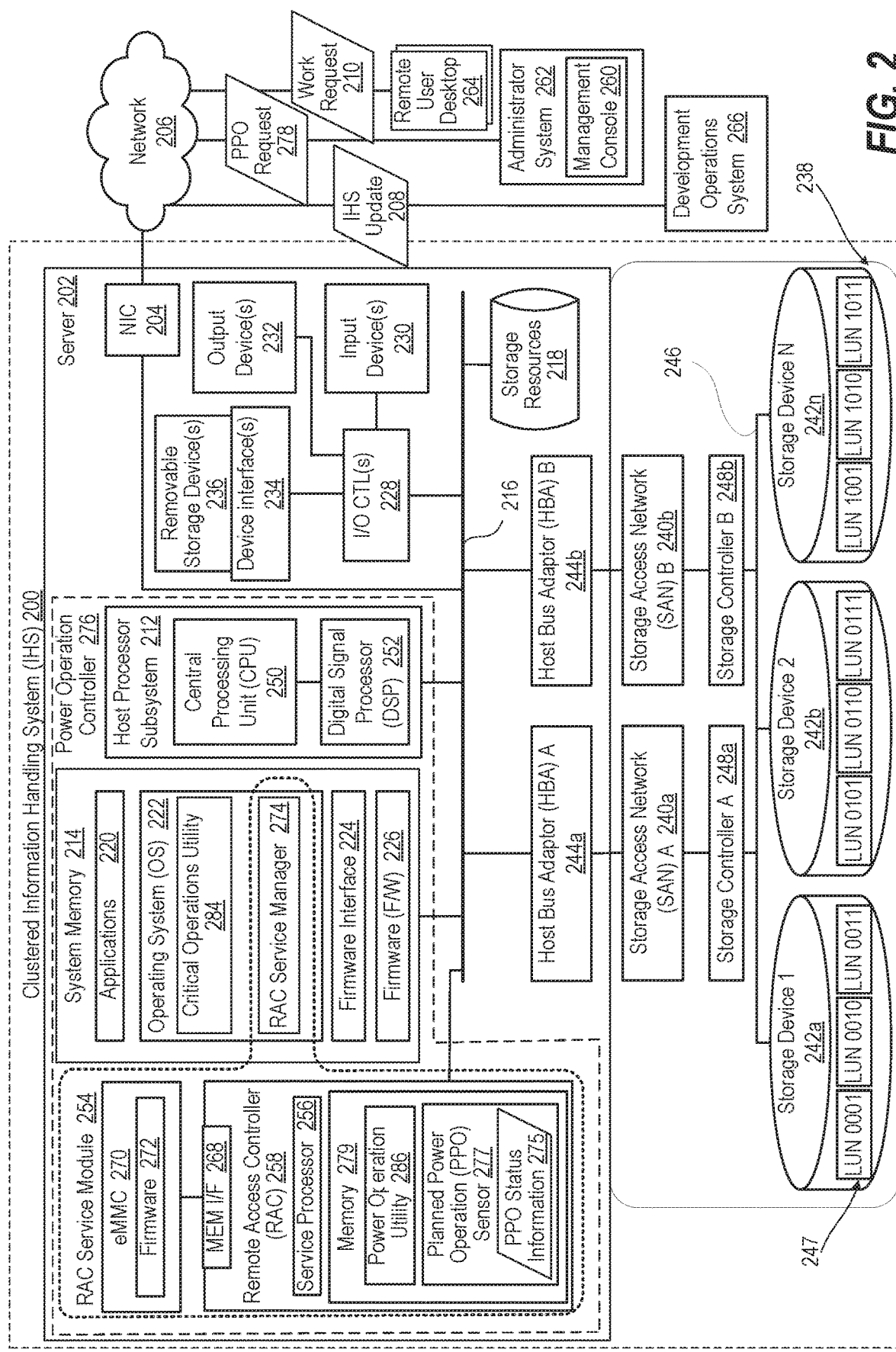
FIG. 2 illustrates a block diagram representation of an example clustered IHS having a server that avoids concurrent scheduling of power operations and critical operations, according to one or more embodiments.

FIG. 2 illustrates a block diagram representation of an example clustered IHS 200 having server 202 that avoids concurrent power operations and critical operations. Cluster IHS 200 is an example implementation of IHS 100 (FIG. 1). Critical operations can include maintaining high availability of delegated processes within a cluster. The delegated processes can include cluster operations and hypervisor operations. Cluster IHS 200 includes server 202. Server 202 includes a network interface, depicted as network interface controller (NIC) 204, in communication via a network 206 to receive IHS updates 208 and work requests 210 from network devices. Host processor subsystem 212 is coupled to system memory 214 via system interconnect 216. System interconnect 216 can be interchangeably referred to as a system bus, in one or more embodiments. System interconnect 216 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 216 can also be a Double Data Rate (DDR) memory interface. System memory 214 can either be contained on separate removable dual inline memory module (RDIMM) devices or system memory 214 can be contained within persistent memory devices (NVDIMMs). For example, the NVDIMM-N variety of NVDIMMs contain both random access memory, which can serve as system memory 214, and non-volatile memory. It should be noted that other channels of communication can be contained within system interconnect 216, including but not limited to i2c or system management bus (SMBus). System interconnect 216 communicatively couples various system components including, for example, replaceable local storage resources 218, such as solid state drives (SDDs) and hard disk drives (HDDs), within which can be stored one or more software and/or firmware modules and one or more sets of data that can be utilized during operations of clustered IHS 200. Specifically, in one embodiment, system memory 214 can include therein a plurality of such modules, including one or more of application(s) 220, operating system (OS) 222, firmware interface 224 such as basic input/output system (BIOS) or Uniform Extensible Firmware Interface (UEFI), and platform firmware (FW) 226. These software and/or firmware modules have varying functionality when their corresponding program code is executed by host processor subsystem 212 or secondary processing devices within clustered IHS 200. For example, application(s) 220 may include a word processing application, a presentation application, and a management station application, among other applications.

Clustered IHS 200 further includes one or more input/output (I/O) controllers 228 that support connection by and processing of signals from one or more connected input device/s 230, such as a keyboard, mouse, touch screen, or microphone. I/O controllers 228 also support connection to and forwarding of output signals to one or more connected output devices 232, such as a monitor or display device or audio speaker(s). Additionally, in one or more embodiments, one or more device interfaces 234, such as an optical reader, a universal serial bus (USB), a card reader, Personal Computer Memory Card International Association (PCMCIA) slot, and/or a high-definition multimedia interface (HDMI), can be associated with clustered IHS 200. Device interface(s) 234 can be utilized to enable data to be read from or stored to corresponding removable storage device/s 236, such as a compact disk (CD), digital video disk (DVD), flash drive, or flash memory card. In one or more embodiments, device interface(s) 234 can further include general purpose I/O interfaces such as inter-integrated circuit (I²C), system management bus (SMB), and peripheral component interconnect (PCI) buses.

Remote and highly available storage is provided by a storage system 238 that includes storage area networks (SANs) 240a, 240b. Each SAN 240a, 240b is a high-speed network of shared storage systems, depicted as storage devices 242a, 242b, 242n. SANs 240a, 240b may be used to provide centralized data sharing, data backup, and storage management. Although a SAN 240a, 240b may include multiple servers and multiple storage systems, server 202, for clarity, is a single server having two host bus adapters (HBAs) 244a, 244b coupled to storage system 238 having storage devices 242a, 242b, 242n. Server 202 and storage system 238 are coupled to one another across a switching network 246. Switching network 246 is coupled to server 202 through HBAs 244a, 244b. Storage units or logical unit numbers (LUNs) 247 of storage system 238 are accessed through ports and storage controllers 248a, 248b of storage system 238.

Host processor subsystem 212 can include at least one central processing unit (CPU) 250. In the illustrative embodiment, CPU 250 is augmented by a digital signal processor (DSP) 252. Host processor subsystem 212 interfaces to functional components of clustered IHS 200 such as a baseboard management controller (BMC). Remote access controller (RAC) service module 254 includes a specialized service processor 256 of RAC 258 that performs BMC functionality. For example, RAC 258 monitors the physical state of a computer, network server or other hardware device, such as server 202, using sensors and communicating with a system administrator through a connection, such as NIC 204. NIC 204 enables clustered IHS 200 and/or components within clustered IHS 200 to communicate and/or interface with other devices, services, and components that are located external to clustered IHS 200. These devices, services, and components can interface with clustered IHS 200 via an external network, such as example network 206, using one or more communication protocols that include transport control protocol (TCP/IP) and network block device (NBD) protocol. Network 206 can be a local area network, wide area network, personal area network, and the like, and the connection to and/or between network and clustered IHS 200 can be wired, wireless, or a combination thereof. For purposes of discussion, network 206 is indicated as a single collective component for simplicity. However, it should be appreciated that network 206 can comprise one or more direct connections to other devices as well as a more complex set of interconnections as can exist within a local area network or a wide area network, such as the Internet.

As a non-limiting example, RAC 258 can be an improved integrated Dell Remote Access Controller (iDRAC) from Dell® that supports power operation functionality described herein. iDRAC has the ability to edit/create files locally to itself. iDRAC also has the ability to see OS specific files. RAC 258 performs out-of-band communication for clustered IHS 200 via NIC 204 and network 206 to a network device. Network devices can include one or more of management console 260 on administrator system 262, remote user desktop 264, and development operations system 266.

Internal to RAC service module 254, RAC 258 can have access, via memory interface (I/F) 268, to a persistent storage device of RAC service module 254 such as an embedded multimedia card (eMMC) 270. eMMC 270 is a flash memory and controller packaged into a small ball grid array (BGA) integrated circuit (IC) package. Request for power operation can be required to restart service processor 256 to load upgraded firmware 272. To interface with host processor subsystem 212, RAC service module 254 utilizes RAC service manager 274 contained in system memory 214 and executed by host processor subsystem 212. In particular, RAC service manager 274 allows accessing and modifying status information 275 contained in planned power operation (PPO) sensor 277, which is a software data structure contained in RAC memory 279.

Host processor subsystem 212 and RAC service module 254 can function together as power operation controller 276 to handle power operation requests without interrupting critical operations. RAC 258 can receive a power operation request 278 from one of management console 260 on administrator system 262, remote user desktop 264, and development operations system 266. Host processor subsystem 212 can determine a need to perform a critical operation based on a detected problem or other maintenance need with network resources such as storage system 238. Power operation controller 276 includes critical operations utility 284 in system memory 214. Critical operations utility 284 is executed by host processor subsystem 212 in coordination with power operation utility 286 in RAC memory 279 and executed by RAC 258. Power operation controller 276 determines whether a power operation request is received from a customer system. Customer system can be one of management console 260 on administrator system 262, remote user desktop 264, and development operations system 266. Power operation request can be associated with IHS upgrade software 267. In response to determining that the power operation request is received from the customer system, RAC 258 indirectly communicates the power operation request with host processor subsystem 212 via RAC service manager 274 and PPO sensor 277.

Figure 3:
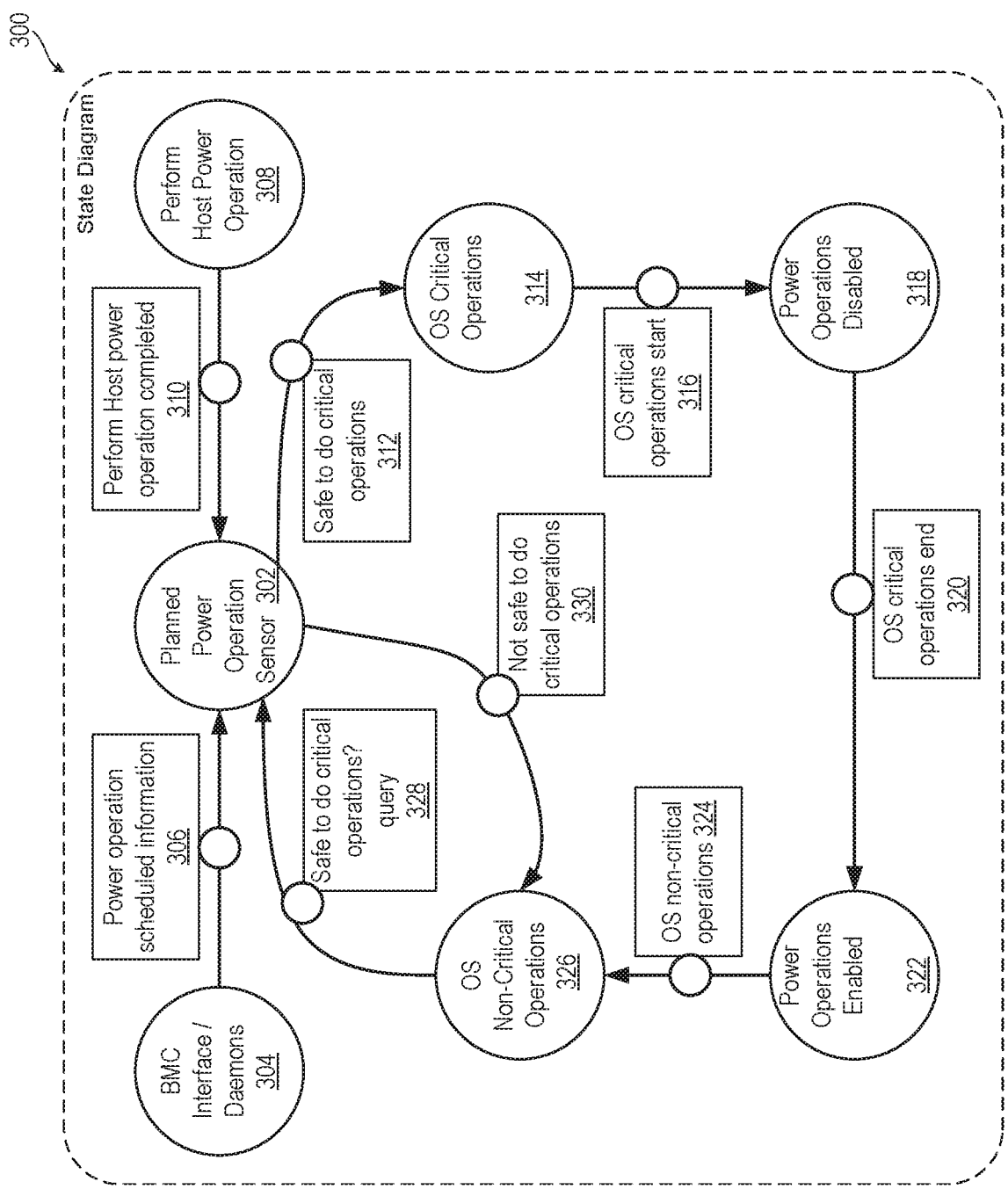
FIG. 3 is a state diagram illustrating a procedure of informing a host processor subsystem of planned power down events or reboot activities, according to one or more embodiments.

FIG. 3 provides a state diagram 300 illustrating a behavior and corresponding states of components within IHS 100/200 when host processor subsystem 212 (FIG. 2) is informed of planned power down events or reboot activities. Once informed, host processor subsystem 212 (FIG. 2) does not initiate maintenance activities during this time period. State diagram 300 begins with PPO sensor 302 receiving updates. BMC interface/daemons 304 updates PPO sensor 302 with power operation scheduled information 306 for a scheduled power operation. Perform host power operation module 308 updates PPO sensor 302 with perform host power operation completed information 310. When PPO sensor 302 is determined to contain safe to do critical operations information 312, operating system (OS) critical operations state 314 can be entered. OS critical operations state 314 enables OS critical operations start event 316 to occur. When OS critical event start event 316 occurs, power operations disabled state 318 is entered. When OS critical operations end event 320 occurs, power operations enabled state 322 is entered. OS non-critical operations event 324 occurs during a normal operating period of OS non-critical operations state 326. During this period, host processor subsystem 212 (FIG. 2) can perform a safe to do critical operations query 328 based on a regular schedule or any current power operation requests contained in PPO sensor 302. If not safe to do critical operations condition 330 is present, host processor subsystem 212 (FIG. 2) remains in OS non-critical operations state 324. When it is determined that PPO sensor 302 contains safe to do critical operations information 312, OS critical operations state 314 can again be entered.

Figure 4:
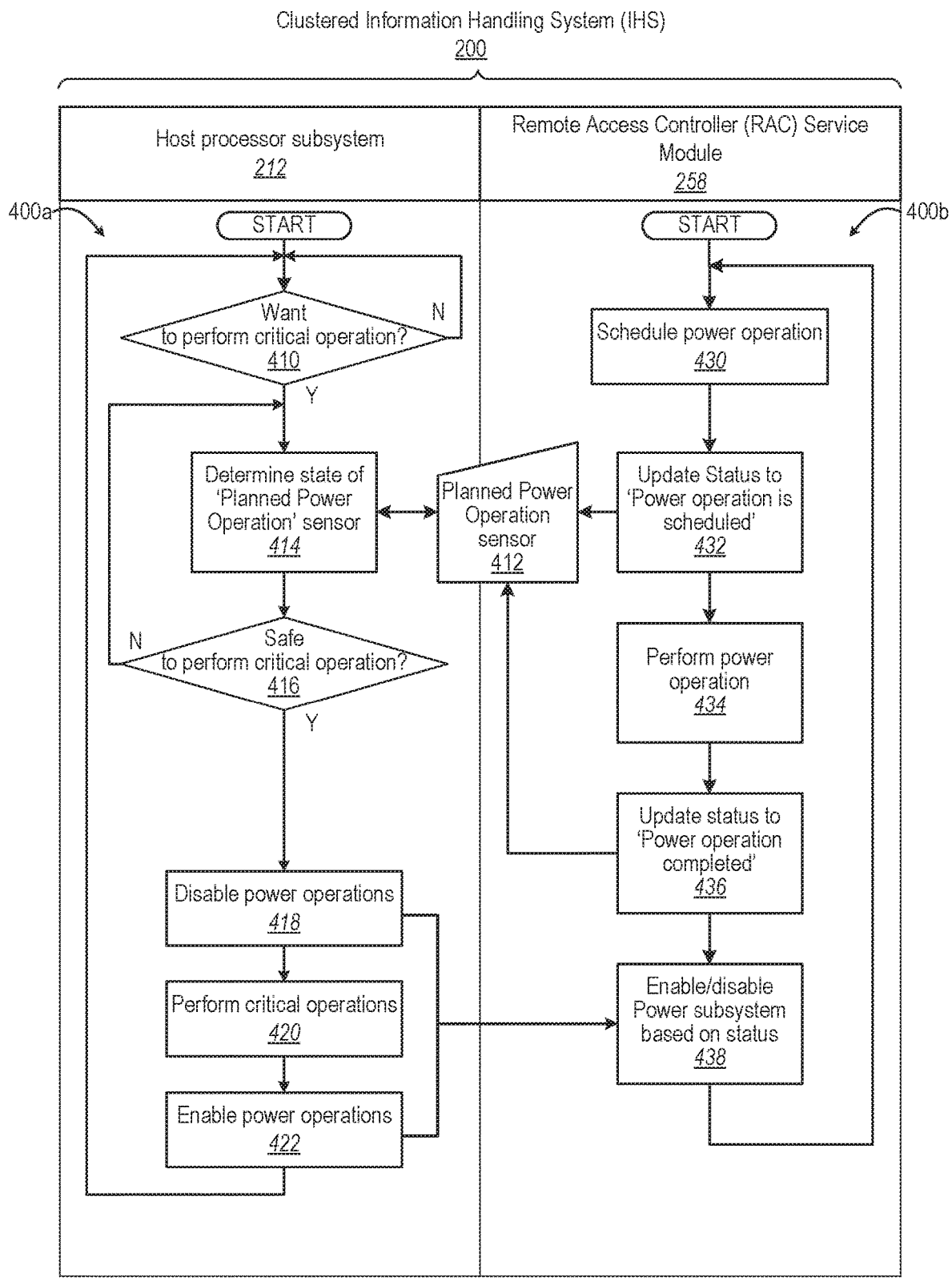
FIG. 4 is a flow diagram illustrating an interactive method between host processor subsystem and baseboard management controller (BMC) of an IHS, according to one or more embodiments.

FIG. 4 is a flow diagram illustrating method 400a and 400b interactively performed by host processor subsystem 212 and RAC service module 258 of clustered IHS 200. In addition to other capabilities, RAC service module 258 provides functions of BCM for clustered IHS 200. Host processor subsystem 212 makes a determination of whether performance of a critical operation is wanted (decision block 410). In response to determining that performance of a critical operation is not wanted, method 400a returns to block 410. In response to determining that performance of a critical operation is wanted, method 400a includes reading/receiving state of PPO sensor 412 by host processor subsystem 212 (block 414). Method 400a includes determining, by host processor subsystem 212, whether state of PPO sensor 412 indicates that it is safe to perform critical operation (decision block 416). In response to determining that the state is not safe to perform critical operation, method 400a returns to block 414. In response to determining that the state is safe to perform critical operation, method 400a includes disabling power operations by host processor subsystem 212 (block 418). Host processor subsystem 212 performs critical operations (block 420). Having completed critical operations, method 400a includes enabling, by host processor subsystem 212, power operations for clustered IHS 200 (block 422). Then method 400a returns to block 410.

Method 400b includes scheduling power operation by RAC service module 258 according to information in PPO sensor that indicates allowable time periods for scheduling power operations 412 (block 430). Method 400b includes updating status to "power operation is scheduled" in PPO sensor 412 by RAC service module 258 (block 432). RAC service module 258 performs power operation (block 434). Method 400b includes updating, by RAC service module 258, a status in PPO sensor 412 to "power operation completed" (block 436). RAC service module 258 enables or disables its ability to perform power operation in response to the corresponding command by host processor subsystem 212 via PPO sensor 412 (block 438). Then method 400b returns to block 430.

Figure 5:
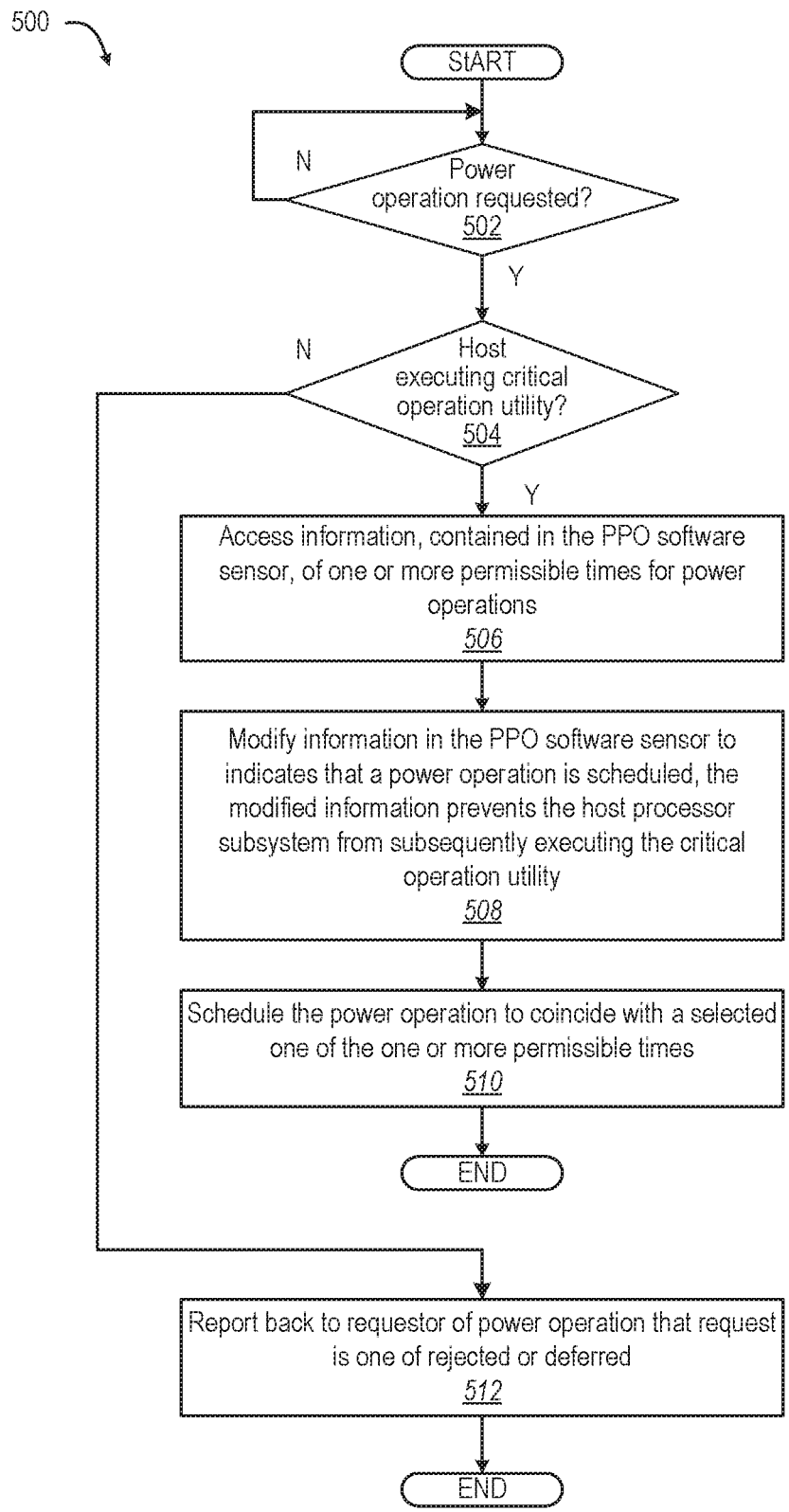
FIG. 5 is a flow diagram illustrating a method of preventing maintenance operations from interfering with critical operations of an IHS, according to one or more embodiments.

FIG. 5 is a flow diagram illustrating a method 500 of preventing maintenance operations from interfering with critical operations of clustered IHS 200 (FIG. 2). In one or more embodiments, method 500 includes determining, by a BMC such as RAC service module 258 (FIG. 2), whether a power operation is requested for a host processor subsystem 212 (FIG. 2) of clustered IHS 200 (FIG. 2) (decision block 502). In response to determining that a power operation is not requested, method 500 returns to block 502. In response to determining that a power operation is requested, method 500 includes determining whether a PPO software sensor contained in BMC memory contains information that indicates that the host processor subsystem is executing a critical operation utility (decision block 504). In response to determining that the host processor subsystem is not executing the critical operation utility, method 500 includes accessing information, contained in the PPO software sensor, of one or more permissible times for power operations (block 506). Method 500 includes modifying information in the PPO software sensor to indicate that a power operation is scheduled. The modified information prevents the host processor subsystem from subsequently initiating execution of the critical operation utility (block 508). Method 500 includes scheduling the power operation to coincide with a selected one of the one or more permissible times (block 510). Then method 500 ends. In response to determining that the host processor subsystem is executing the critical operation utility, method 500 includes reporting back to a requestor of the power operation that the request is one of rejected and deferred (block 512). Then method 500 ends.

Figure 6:
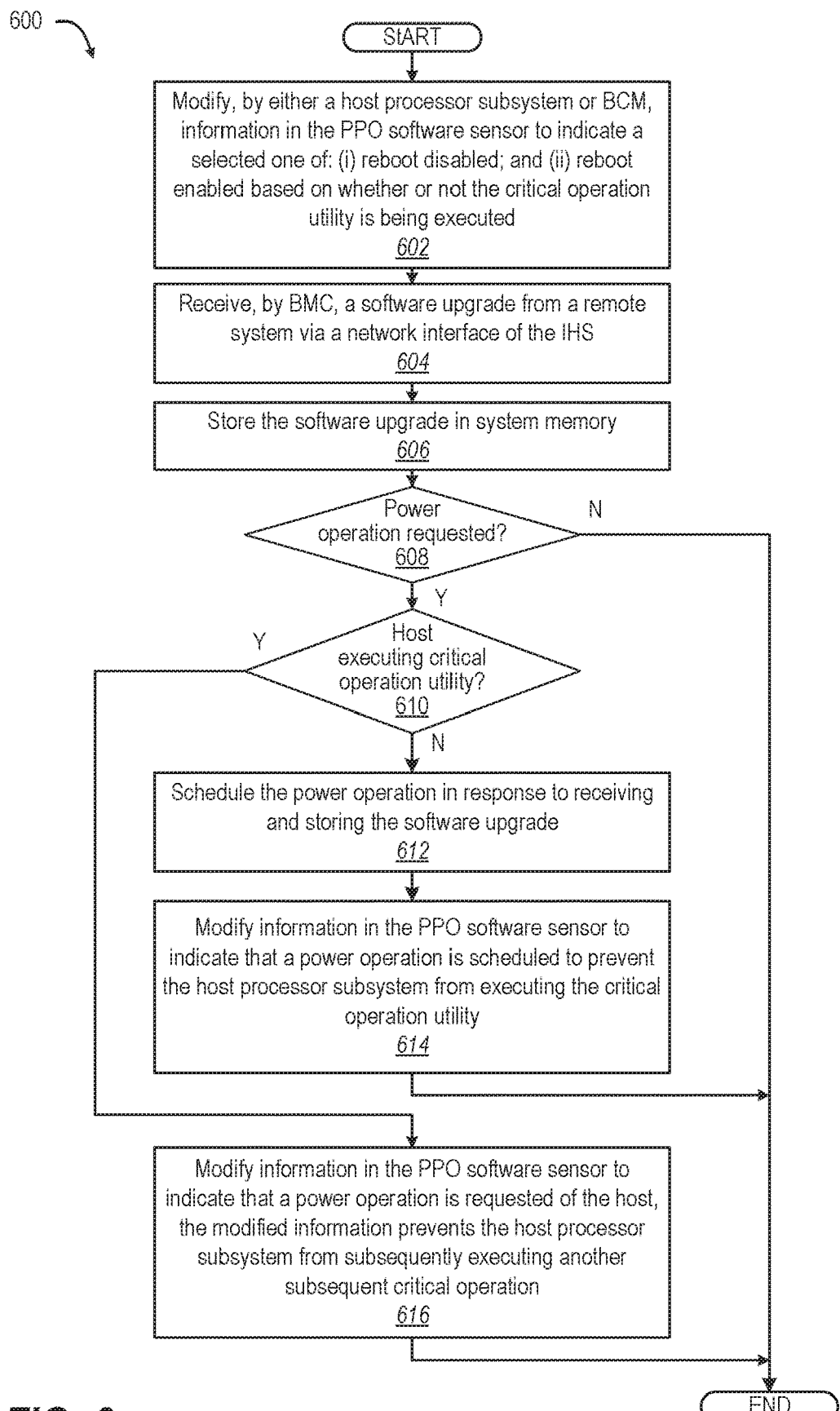
FIG. 6 is a flow diagram illustrating a method of upgrading software without interfering with critical operations of an IHS, according to one or more embodiments.

FIG. 6 is a flow diagram illustrating a method 600 of preventing maintenance operations such as a software upgrade from interfering with critical operations of an IHS. In one or more embodiments, method 600 includes modifying, by either host processor subsystem 212 (FIG. 2) or BCM, such as RAC service module 254 (FIG. 2), information in the PPO software sensor to indicate a selected one of (i) reboot disabled and (ii) reboot enabled based on respectively whether or not the critical operation utility is being executed (block 602). Method 600 includes receiving, by BMC, a software upgrade from a remote system via a network interface of the IHS (block 604). Method 600 includes storing the software upgrade in system memory (block 606). Method 600 includes determining, based on the stored software upgrade, whether a power operation is requested for a host processor subsystem of an IHS (decision block 608). In response to determining that the power operation is not requested, method 600 ends. In response to determining that the power operation is requested, method 600 includes determining whether a PPO software sensor contained in BMC memory contains information that indicates that the host processor subsystem is executing a critical operation utility contained in system memory (decision block 610). In response to determining that the host processor subsystem is not executing the critical operation utility, method 600 includes scheduling the power operation (block 612). Method 600 includes modifying information in the PPO software sensor to indicate that a power operation is scheduled. The modified information prevents the host processor subsystem from subsequently initiating execution of the critical operation utility (block 614). Then method 600 ends. In response to determining that the host processor subsystem is executing the critical operation utility, method 600 includes modifying information in the PPO software sensor to indicate that a power operation is requested of the host processor subsystem. The modified information prevents the host processor subsystem from subsequently initiating execution of another critical operation (block 616). Then method 600 ends.

In the above described flow charts of FIGS. 4-6 one or more of the methods may be embodied in an automated control system, such as power operation controller 276 (FIG. 2) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   memory containing a critical operation utility;
   a host processor subsystem communicatively coupled to the memory and which executes the critical operation utility; and
   a baseboard management controller (BMC) communicatively coupled to the memory, the BMC comprising BMC memory with a planned power operation (PPO) software sensor and a service processor that executes a power operation utility to enable the IHS to:
      determine that a power operation is requested for the host processor subsystem; and
      in response to determining that the power operation is requested:
         determine whether the PPO software sensor contains information indicating that the host processor subsystem is not executing the critical operation utility; and
         in response to determining that the host processor subsystem is not executing the critical operation utility:
            modify information in the PPO software sensor to indicate that a power operation is scheduled, the modified information preventing the host processor subsystem from subsequently initiating execution of the critical operation utility;
            access information, contained in the PPO software sensor, of one or more permissible times for power operations;
            reject any critical activities during times in which the BMC is configured to request a reboot; and
            schedule the power operation of the host processor subsystem to coincide with a selected one of the one or more permissible times.

2. The IHS of claim 1, wherein:
   the host processor subsystem modifies information in the PPO software sensor to indicate, based on whether or not the critical operation utility is being executed by the host processor subsystem, a selected one of: (i) reboot disabled; and (ii) reboot enabled;
   a RAC service manager accesses and modifies status information contained in the PPO sensor to identify receipt of the power operation request; and
   the host processor subsystem checks PPO software sensor before initiating a maintenance activity that includes executing the critical operation utility.

3. The IHS of claim 1, wherein the critical operation utility supports a single-tasked cluster operation.

4. The IHS of claim 1, wherein, in response to determining that the host processor subsystem is executing the critical operation utility, the BMC modifies information in the PPO software sensor to indicate that the power operation is requested, the modified information prevents the host processor subsystem from subsequently initiating execution of another critical operation.

5. The IHS of claim 1, further comprising: a network interface communicatively coupled to a remote system, wherein the BMC comprises a remote access controller (RAC) service module comprising:
   a RAC service manager executed by the host processor subsystem of the IHS to interact with the PPO software sensor;
   a RAC communicatively coupled to the network interface, the RAC comprising the service processor which executes the power operation utility that enables the RAC service module to:
      receive a software upgrade from the remote system;
      store, via the RAC service manager, the software upgrade in system memory; and
      schedule the power operation in response to receiving and storing the software upgrade.

6. The IHS of claim 5, wherein the RAC schedules the power operation by modifying information in the PPO software sensor to indicate the scheduled reboot.

7. The IHS of claim 1, wherein the critical operation utility supports a virtual machine (VM).

8. The IHS of claim 1, wherein the BMC updates the PPO software sensor with power operation scheduled information for a scheduled power operation.

9. A baseboard management controller (BMC) of an information handling system (IHS) comprising:
   a system interface communicatively coupled to memory of the IHS, the memory containing a critical operation utility that is executed by a host processor subsystem of the IHS;
   a BMC memory with a planned power operation (PPO) software sensor stored therein;
   a service processor that executes a power operation utility to enable the BMC to:
      determine that a power operation is requested for the host processor subsystem; and
      in response to determining that the power operation is requested:
         determine whether the PPO software sensor contains information that indicates that the host processor subsystem is not executing the critical operation utility; and
         in response to determining that the host processor subsystem is not executing the critical operation utility:
            modifies information in the PPO software sensor to indicate that a power operation is scheduled, the modified information prevents the host processor subsystem from subsequently initiating execution of the critical operation utility; and accesses information, contained in the PPO software sensor, of one or more permissible times for power operations;
reject any critical activities during times in which the BMC is configured to request a reboot; and
schedules the power operation of the host processor subsystem to coincide with a selected one of the one or more permissible times.

10. The BMC of claim 9, wherein the critical operation utility supports a single-tasked cluster operation.

11. The BMC of claim 9, wherein, in response to determining that the host processor subsystem is executing the critical operation utility, the service processor modifies information in the PPO software sensor to indicate that a power operation is requested to prevent the host processor subsystem from subsequently initiating execution of another critical operation.

12. A method of preventing maintenance operations from interfering with critical operations of an information handling system (IHS), the method comprising:
determining, by a baseboard management controller (BMC), that a power operation is requested for a host processor subsystem of an IHS; and
in response to determining that the power operation is requested:
determining that a planned power operation (PPO) software sensor contained in a BMC memory contains information that indicates that the host processor subsystem is not executing a critical operation utility contained in memory; and
in response to determining that the host processor subsystem is not executing the critical operation utility:
modifying information in the PPO software sensor to indicate that a power operation is scheduled, the modified information prevents the host processor subsystem from subsequently initiating execution of the critical operation utility;
accessing information, contained in the PPO software sensor, of one or more permissible times for power operations;
rejecting any critical activities during times in which the BMC is configured to request a reboot; and
scheduling the power operation of the host processor subsystem to coincide with a selected one of the one or more permissible times.

13. The method of claim 12, wherein the critical operation utility supports one of a single-tasked cluster operation and a virtual machine (VM).

14. The method of claim 13, wherein scheduling the power operation comprises modifying information in the PPO software sensor to indicate the scheduled reboot.

15. The method of claim 12, further comprising:
modifying information in the PPO software sensor to indicate a selected one of: (i) reboot disabled; and (ii) reboot enabled based on whether or not the critical operation utility is being executed;
accessing and modifying, by a RAC service manager, status information contained in the PPO software sensor to identify receipt of the power operation request; and
checking, by the host processor subsystem, PPO software sensor before initiating a maintenance activity that includes executing the critical operation utility.

16. The method of claim 12, further comprising:
receiving a software upgrade from a remote system via a network interface of the IHS;
storing the software upgrade in system memory; and
scheduling the power operation in response to receiving and storing the software upgrade.

* * * * *